Nov. 10, 1936.  G. D. KNODLE  2,060,377
MOTOR VEHICLE REAR END SPOTLIGHT SWITCH
Filed Aug. 1, 1933
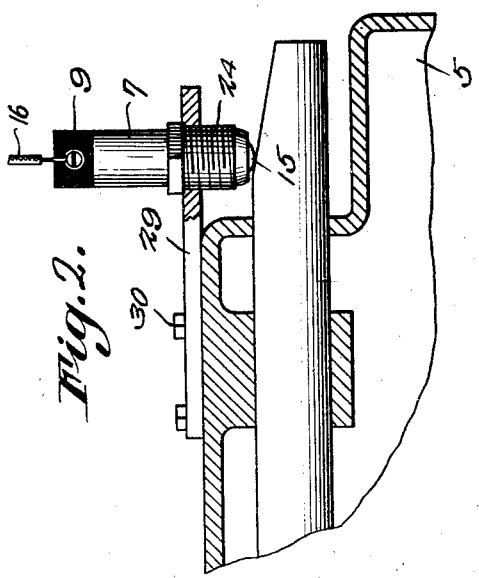
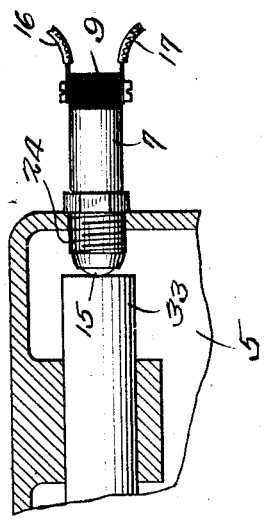
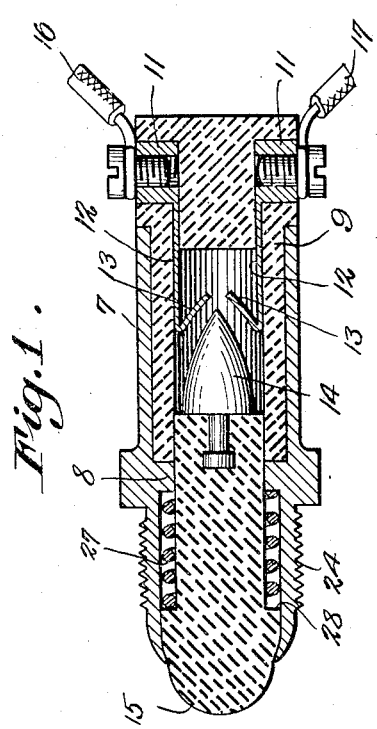
G. D. Knodle
Inventor Patented Nov. 10, 1936

2,060,377

UNITED STATES PATENT OFFICE 2,060,377

MOTOR VEHICLE REAR END SPOTLIGHT SWITCH

Glenn D. Knodle, Bozeman, Mont.

Application August 1, 1933, Serial No. 683,216

1 Claim. (Cl. 200—59)

This invention relates to a spotlight control switch designed primarily for use at the rear of a vehicle, the spotlight being mounted in such a way that the rearward path of travel of the vehicle equipped with the spotlight, will be illuminated, thereby materially aiding the operator of the vehicle, in backing the vehicle at night.

An important object of the invention is to provide a switch which may be readily and easily secured to the transmission housing of a motor vehicle, in such a way that movement of the gear shift lever and gear shift rail to cause a reverse movement of the vehicle, will automatically complete the circuit to the spot light, thereby providing means for automatically controlling the switch to the spotlight.

A still further object of the invention is the provision of a switch of simple construction, the switch embodying a stationary member and a movable member, the stationary member and movable member carrying contacts adapted to cooperate in completing a circuit.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through the body portion of the switch.

Figure 2 is an enlarged fragmental sectional view illustrating one end of a gear shift rail, and a switch supported adjacent thereto, to be operated by movement of the gear shift rail.

Figure 3 is a fragmental sectional view illustrating the switch member as supported on a transmission housing.

Figure 4 is a fragmental sectional view illustrating the switch as positioned in an opening formed in an end wall of the transmission housing.

Referring to the drawing in detail, the reference character 5 designates a transmission housing, which is of the usual and well known construction, the housing having bearings supporting the gear shift rails of the usual transmission.

As clearly shown by Figure 1 of the drawing, the present invention includes a body portion 7, which is substantially tubular in formation, the same being provided with an annular rib 8 that extends inwardly from the switch body. This rib 8 provides a shoulder against which one end of the sleeve 9 engages, the sleeve 9 being constructed of suitable insulating material, such as molded bakelite.

In the construction of the sleeve 9, the contact members 12 are embedded therein, during the molding operation. These contact members 12 have enlarged ends 11, formed with threaded openings to receive wire securing screws, as clearly shown.

As clearly shown by Figure 1 of the drawing, the inner ends of the contact members 12 extend rearwardly as at 13, the ends of the contact members being spaced apart to be bridged by the contact member 14 carried by the plunger 15. Thus it will be seen that due to this construction, the contact member 14 will move between the inwardly extended ends 13 of the contacts 12, completing a circuit.

Wires 16 and 17 connect with the contacts 12, which wires provide a circuit to the spotlight not shown and, which as before stated, is located at the rear of the vehicle, and forms a part of the tail light of the vehicle. In order that the switch member, forming the essence of this invention, may be readily positioned, threads 24 are provided near one end of the switch body portion, which threads are adapted to cooperate with the threads of the opening of the supporting arm which is bolted to the transmission housing.

When the switch member is supported at the end of a transmission housing, the outer end of the plunger 15 lies in the path of travel of the gear shift rail 6 in direct alignment therewith, with the result that when the gear shift rail moves to throw the reverse gears of the transmission into action, the gear shift rail will move the plunger, operating the switch to complete the circuit.

In order that the plunger 15 of the switch member, will be normally held in its extended position, a coiled spring 27 is provided and held between the rib 8 and shoulder 28, the spring being of the expansible type.

In the form of the invention as shown by Figure 2 of the drawing, supporting plate 29 is provided, which plate is bolted to the transmission housing by means of bolts 30, the plate being provided with a threaded opening to receive the threads of the switch body.

When this form of support is used, the upper edge of the gear shift rail is bevelled, so that the bevelled surface slides under the plunger 15, operating the plunger.

As shown by Figure 3 of the drawing, the threaded portion of the tubular body of the switch, extends into the transmission housing, the inner end of the switch lying in the path of travel of the inclined edge 31 of the gear shift rail 32.

In view of the foregoing disclosure, a further detailed description as to the operation of the device is believed unnecessary.

What is claimed is:

A switch adapted to be secured in one wall of a transmission housing, comprising a tubular casing, and an annular internal rib formed on the casing, an external annular rib formed on the casing, a plunger having a rounded outer end mounted within the casing and extending beyond one end of the casing, one end of the casing being extended inwardly contacting with the rounded end of the plunger and restricting outward movement of the plunger, an annular shoulder formed on the plunger, a coiled spring disposed between the internal annular rib of the housing and annular shoulder of the plunger, normally urging the plunger outwardly, contact members within the casing, a cone-shaped contact member on the inner end of the plunger and adapted to move into engagement with the contact members, completing a circuit, and threads on said casing to be fitted in a threaded opening of the transmission casing, securing the switch in position.

GLENN D. KNODLE.